United States Patent [19]

Stewart et al.

[11] Patent Number: 5,058,044

[45] Date of Patent: Oct. 15, 1991

[54] AUTOMATED MAINTENANCE CHECKING SYSTEM

[75] Inventors: Stedman J. Stewart, Littleton; Charles A. Barbour, Jr., Thornton; Howard E. Breeden, Oak Brook, all of Ill.

[73] Assignee: Auto I.D. Inc., Lakewood, Colo.

[21] Appl. No.: 331,278

[22] Filed: Mar. 30, 1989

[51] Int. Cl.[5] .......................... G06F 15/20; G01D 3/00

[52] U.S. Cl. .......................... 364/551.01; 340/825.54; 346/33 R; 364/424.04

[58] Field of Search .............. 364/550, 551.01, 464.01, 364/424.04, 465, 467, 424.03, 479, 510; 340/825.3, 825.31, 825.54, 933, 941, 438, 439; 346/33 R, 33 MC

[56] References Cited

U.S. PATENT DOCUMENTS

| | | | |
|---|---|---|---|
| 4,258,421 | 3/1981 | Juhasz et al. | 364/424 |
| 4,267,569 | 5/1981 | Baumann et al. | 364/424 |
| 4,344,136 | 8/1982 | Panik | 364/424 |
| 4,404,639 | 9/1983 | McGuire et al. | 364/424 |
| 4,490,798 | 12/1984 | Frank et al. | 364/550 |
| 4,525,782 | 6/1985 | Wohlfarth et al | 364/424 |
| 4,658,371 | 4/1987 | Walsh et al. | 364/550 |
| 4,667,429 | 6/1987 | Glotzbach | 364/424 |
| 4,757,463 | 7/1988 | Ballou et al. | 364/424 |
| 4,831,539 | 5/1989 | Hagenbush | 364/424 |
| 3,090,042 | 5/1963 | Kleist et al. | 343/6.5 |
| 3,377,616 | 4/1968 | Auer, Jr. | 340/23 |
| 3,530,434 | 9/1970 | Stites et al. | 340/149 |
| 3,639,731 | 2/1972 | McNeill | 235/61.11 |
| 3,665,397 | 5/1972 | Di Napoli et al. | 340/147 |
| 3,689,885 | 9/1972 | Kaplan et al. | 340/152 |
| 3,859,624 | 1/1975 | Kriofsky et al. | 340/941 |
| 4,072,850 | 2/1978 | McGlynn | 364/424.04 |
| 4,188,618 | 2/1980 | Weisbart | 364/424.04 |
| 4,388,524 | 6/1983 | Walton | 340/825.3 |
| 4,398,172 | 8/1983 | Carroll et al. | 340/825.54 |
| 4,550,444 | 10/1985 | Uebel | 340/825.54 |
| 4,603,390 | 7/1986 | Mehdipour et al. | 364/467 |
| 4,630,044 | 12/1986 | Polzer | 340/825.54 |
| 4,665,395 | 5/1987 | Van Ness | 340/825.31 |
| 4,714,925 | 12/1987 | Bartlett | 340/825.54 |
| 4,731,867 | 3/1988 | Seabury et al. | 340/941 |

FOREIGN PATENT DOCUMENTS 2563028 10/1985 France .

OTHER PUBLICATIONS

"Budget to Test Automated Return System," *Automotive Fleet,* Dec. 1987, p. 130.

"Put a Sensor in Your Tank," *High Technology Business,* Jun. 1988, vol. 8, No. 6, p. 11.

*Primary Examiner*—Kevin J. Teska

*Attorney, Agent, or Firm*—Leydig, Voit & Mayer

[57] ABSTRACT

A system for automatically identifying vehicles, assimilating data from an identified vehicle, correlating the data with predetermined data and providing a statement of account indicative of a transaction involving the vehicle. The system also provides a service record of the vehicle for use in connection with the transaction. For example, in a car rental environment, the service report is utilized by an attendant to determine if such service items as refilling the fuel tank are necessary. Primarily, data for the service record is provided by sensors located on-board the vehicle. The sensor data may be supplemented by data inputted via a keyboard located on-board the vehicle.

13 Claims, 13 Drawing Sheets

AUTOMATED MAINTENANCE CHECKING SYSTEM

TECHNICAL FIELD

The invention generally relates to systems for processing vehicle information and in particular to a system for automating maintenance routines and transactions related thereto.

BACKGROUND

Available systems for maintenance of passenger vehicles typically require maintenance records to be manually updated. In this regard, an operator of a passenger vehicle is typically required to verbally communicate to a mechanic the maintenance needs of the vehicle for even the simplest of jobs. For example, in a commercial vehicle repair operation, passenger vehicles are usually dropped off at a service site where the operator of the vehicle verbally describes the needed maintenance or a malfunctioning condition before leaving the vehicle at the site for servicing. In a car rental system, a returned vehicle is visually inspected for damage beyond normal wear resulting from the rental. Many problems are not immediately apparent from a visual inspection. When the symptoms of these problems are noticed, the vehicle may have been returned to service and, therefore, the source of the damage cannot be determined. Also, routine maintenance of a rental vehicle is typically performed after it has been returned from service and before it is placed back into the rental fleet. This routine maintenance also requires a visual inspection of the vehicle in order to ensure devices such as head and taillights are properly functioning.

Some suggestions have been made in the past to employ available technology for the purpose of automating transactions concerning vehicles. For example, U.S. Pat. No. 4,398,172 to Carroll, et al. suggests that a system for interrogating memories on-board vehicles may be used to create an automatic billing system in a car rental environment. Applicants are not aware, however, of a system providing for the full automation of a vehicle transaction, including the routine record keeping associated with the complete maintenance of a vehicle.

SUMMARY OF THE INVENTION

It is the general object of the invention to automatically collect data related to the operational history of a vehicle and provide the same in a format useable for a commercial transaction.

It is a related object of the invention to provide a system for accomplishing the foregoing object which may be easily and inexpensively integrated into existing systems used for vehicle-related commercial transactions.

It is another important object of the invention to provide a system for the automatic recording of the operational history of a vehicle for use by a mechanic in determining its maintenance requirements.

It is another object of the invention to provide a system for contemporaneously recording in a machine-readable form the malfunctioning of selected systems and their components in a vehicle.

These and other objects and advantages of the invention will become more apparent from the following detailed description when taken in conjunction with the accompanying drawings.

To achieve the foregoing objects, a system according to the invention includes a processing system on-board a vehicle for gathering data related to the operational history of the vehicle and transferring the data to a stationary processing system for providing information to a mechanic regarding needed repairs and to also provide for the automation of commercial transactions such as the billing of vehicle rentals or of repair work to an owned/leased vehicle. The on-board system includes a processor for collecting data from sensors associated with selected operating systems of the vehicle (e.g., lights, drive train, tires and fluid levels). Depending upon the system monitored, the processor may continually update its condition (e.g., mileage and gas level) in a storage area or it may only store information when service is required (e.g., lights and drive train). When the vehicle enters a service area, the on-board system is interrogated for its stored information. The interrogation is executed by an annunciator system which first detects the physical presence of the vehicle and then transmits an RF interrogation signal to a receiver on-board the vehicle and coupled to the on-board processor. If the interrogation signal is recognized by the on-board processor, a vehicle identification code along with the stored information is converted to an RF signal and transmitted from the vehicle.

Associated with the stationary system is a receiver for receiving and converting the RF signal from the vehicle to a digital format for processing. The identification code received from the vehicle is matched by the stationary system with the same identification code held in a memory. Information stored at the stationary system and associated with the matched identification code is retrieved and processed with information downloaded from the vehicle. In accordance with the invention, the processing of the combined information identifies particular systems and system devices of the vehicle which require maintenance. The information is also processed so as to totally automate any commercial transaction associated with the maintenance. In a preferred embodiment, the invention is applied to a car rental system so as to automate billing and track maintenance needs of each vehicle upon its return from rental service. In an alternative embodiment, applicants contemplate applying the invention to commercial car repair operations such that a car owner/leaseholder can drop off a car at a service location which interrogates the on-board processor and compiles a work order based on the information received from the vehicle and stored at the service location.

In a car rental environment, a vehicle which is returned after rental is driven to a designated site which is marked, for example, by a gate with a stop/go light indicating the vehicle should stop. When the vehicle enters the site, the system senses the presence of the vehicle and responds by transmitting an interrogation signal to the vehicle. When the vehicle receives the interrogation signal it responds by transmitting identification and operating parameter information to the system. After this information is processed, it is verified by the system and if the information is determined to be acceptable, the system sends a signal to the site indicating that the information was properly received. Such a step involves the system sending a control signal to the designated site which opens the gate and changes the condition of the stop/go light to indicate the vehicle may advance. In a preferred embodiment, the system is capable of simultaneously servicing multiple sites such that many vehicles may be processed at the same time.

In addition, to interrogation of a vehicle for the downloading of data, the system of the invention may also be used to program vehicle parameters. For example, parameters such as trip mileage, license plate number or other vehicle identification information or vehicle servicing information may be set or modified in a memory located on-board the vehicle.

Preferably, identification and operating information gathered from the vehicle is processed into a predetermined digital form and made available to a pre-existing main computer system through a standard communications link. By operating in this manner, the system is made easily compatible with pre-existing systems, and is capable of processing information which traditionally has been gathered only through manual methods. Thus, system errors resulting from manual intervention are essentially eliminated, and the time required to gather and process such information is substantially reduced.

Data downloaded from a vehicle is also used to formulate service orders for the vehicle prior to its return to the rental fleet. Downloaded data is analyzed and repair or maintenance orders are generated via a printer and display for use by an attendant. For example, if a vehicle is returned without refilling the fuel tank, the order will indicate the vehicle requires refueling. Other on-board sensors may also provide the basis for maintenance orders-e.g., oil level, window washer shield level and burned-out lamp sensors.

While the invention will be described in connection with a preferred embodiment, there is no intent to limit the invention to that embodiment. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
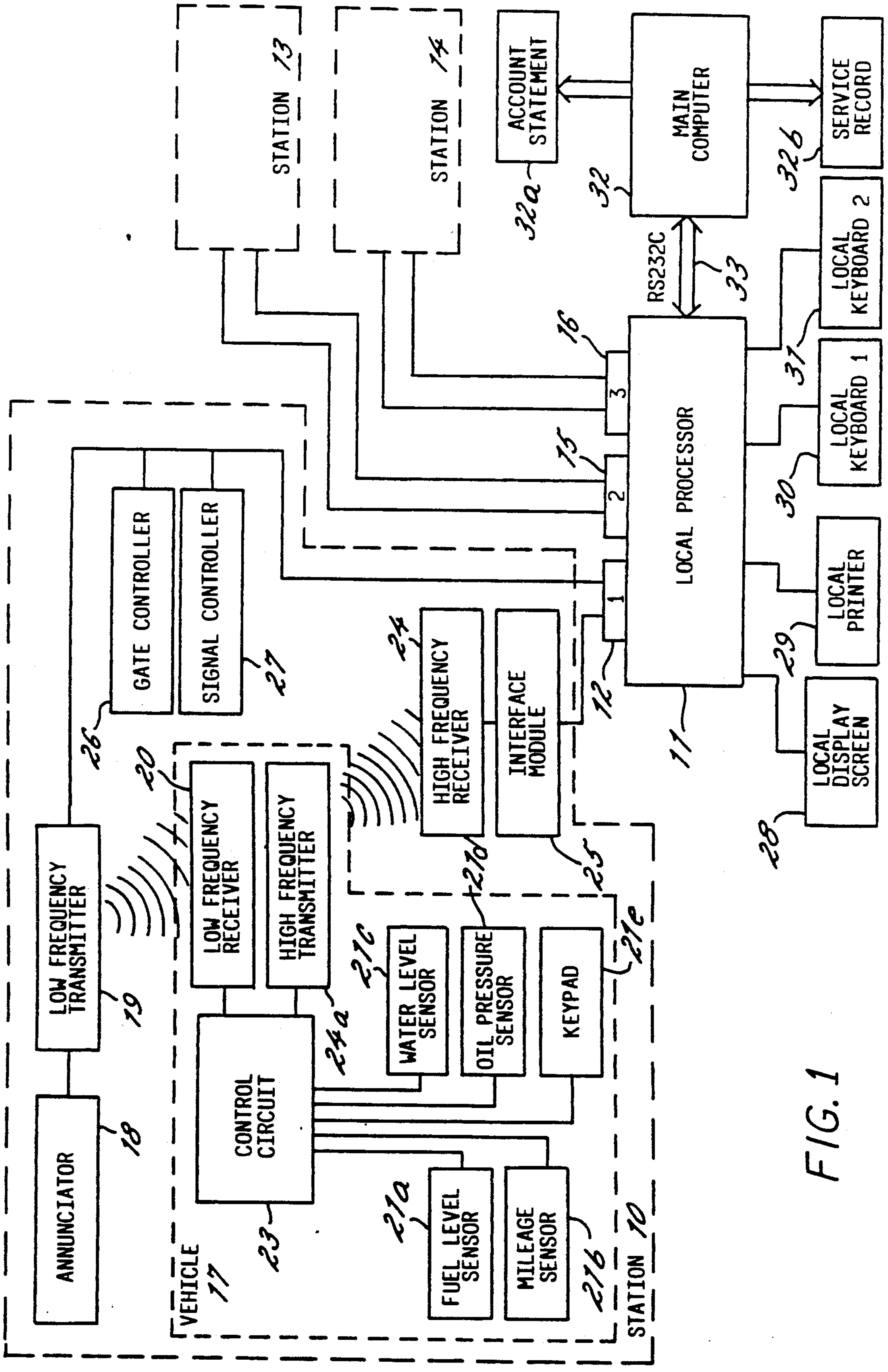
FIG. 1 is a schematic block diagram of a system for processing vehicles in accordance with a preferred embodiment of the invention.

For the purpose of illustrating an exemplary architecture of a system according to the invention, a vehicle (17), (shown in block form) is located within the area serviced by a first station (10) in FIG. 1. The first station (10) functions as a site for the gathering of information from vehicles entering the area of the station, and it is attached to a local processor (11) via an input port (12). Similarly, second and third stations (13) and (14) are attached to the local processor (11) via input ports (15) and (16), respectively. The local processor (11) is of a conventional microprocessor-type architecture based preferably on a Z-80 microprocessor manufactured by Zilog Corporation. The accompanying memory and interfacing chips are preferably low power CMOS technology, so as to operate properly at a wide temperature range. These chips would include an 8K-byte static RAM memory, serial I/O chips such as NSA-8250A's manufactured by National Semiconductor Corporation, parallel I/O chips such as NSA-8251's manufactured by National Semiconductor Corp. and a 32K-bit PROM such as a 27C32 manufactured by Fujitsu Corp. of Japan. In an alternative arrangement, the local processor system may be a microcomputer system such as an IBM PC or compatible. However, in addition to all the standard elements to such a microcomputer system, when used as a local processor a parallel I/O part is required which provides two-way communications in contrast to conventional parallel ports provided on microcomputer systems which only allow one-way transmittal of information to a printer device.

The presence of the vehicle (17) is detected by an annunciator (18). Preferably, the annunciator (18) is of conventional configuration and may be activated, for example, by a vehicle entering the station (10) and interrupting a light beam which is normally received by an optical detector. Alternatively, the annunciator (18) may be a proximity relay of conventional design which detects the presence of the vehicle (17) when it enters the vicinity of the station. Those familiar with annunciators will realize other conventional devices may also suffice.

Upon detecting the presence of the vehicle (17), the annunciator (18) keys a low-frequency transmitter (19) which transmits a low-frequency directional signal to the vehicle. The vehicle (17) detects this low-frequency signal from a low-frequency receiver (20) located on board the vehicle (17). Upon receipt of the low-frequency signal by the low-frequency receiver (20), a control circuit (23) on-board the vehicle is activated and reads gas and mileage information from gas and mileage sensors (21) and (22) and transmits this and vehicle identification information as an RF signal to a high-frequency receiver (24) via a high-frequency transmitter (24a).

The RF signal is decoded by the high-frequency receiver and assimilated into a message which contains identification, gas and mileage information for the vehicle. The resulting message is sent to an interface module (25), preferably via an intermediate frequency link (not shown). The interface module (25) is designed in a conventional manner to decode the data from the intermediate frequency links, convert it from serial to parallel form and block it for readable message content. Specifically, the interface module (25) converts the serially received information from the high-frequency receiver (24) into a digital message which is provided to the local processor (11) via port (12). Upon receiving a message from the interface module (25), the local processor (11) analyzes the message to determine if it is complete. If the message is incomplete or contains out-of-bounds information, the local processor (11) sends a signal to the low-frequency transmitter (19), causing it to re-interrogate the vehicle (17) in order to receive a complete and correct message.

Upon receiving a correct and completed message, the local processor (11) sends the message to a local display screen (28) and/or a local printer (29). Additionally the message is made available for transmission to a main computer (32) via a conventional RS232C communications link (33). Along with the message information, the local processor (11) passes information to the main computer (32) regarding the source of the message, i.e., station (10), (13) or (14).

When the vehicle (17) enters the station (10), gate and signal controllers (26) and (27) respond to the local processor (11) by indicating to the operator of the vehicle that he/she should wait for the interrogation process to be completed. Upon successful completion of the interrogation process, the local processor (11) instructs the gate and signal controllers (26) and (27) to permit the vehicle to leave the station.

In the event that the main computer (32) analyzes the message provided from the local processor (11) and determines that the message is incorrect or incomplete, a message is sent from the main computer to the local processor requesting the latter to re-interrogate the vehicle (17). In such a situation, the local processor will not issue an acknowledgment signal to the gate controller (26) and signal controller (27) until it has received an acknowledgment message from the main computer (32). In an alternative embodiment of the invention, the local processor (11) makes the determination as to whether or not the message is complete and correct and thereby directly controls the gate and signal controllers (26) and (27) without waiting for an acknowledgement from the main computer.

It is contemplated that the local processor (11) be provided with a number of local keyboards such as local keyboards (30) and (31) in the illustrated embodiment. The local keyboards (30) and (31) may be used, for example, to send messages to the local processor (11) requesting tasks for the local processor to complete, such as the re-interrogation of a vehicle. The local keyboard may also be used for sending messages to the main computer (34) which supplement the information downloaded from the vehicle (17). Such a supplementary message contains, for example, information which is gathered from a visual inspection of the vehicle (17) at the station (10). Such messages are expected to be in the form of comments or notes regarding the condition of the vehicle (17). Furthermore, the local keyboards (30) and (31) may function to control the gate or signal controllers (26) and (27) for any one of the stations (10), (12) and (13).

Figure 2:
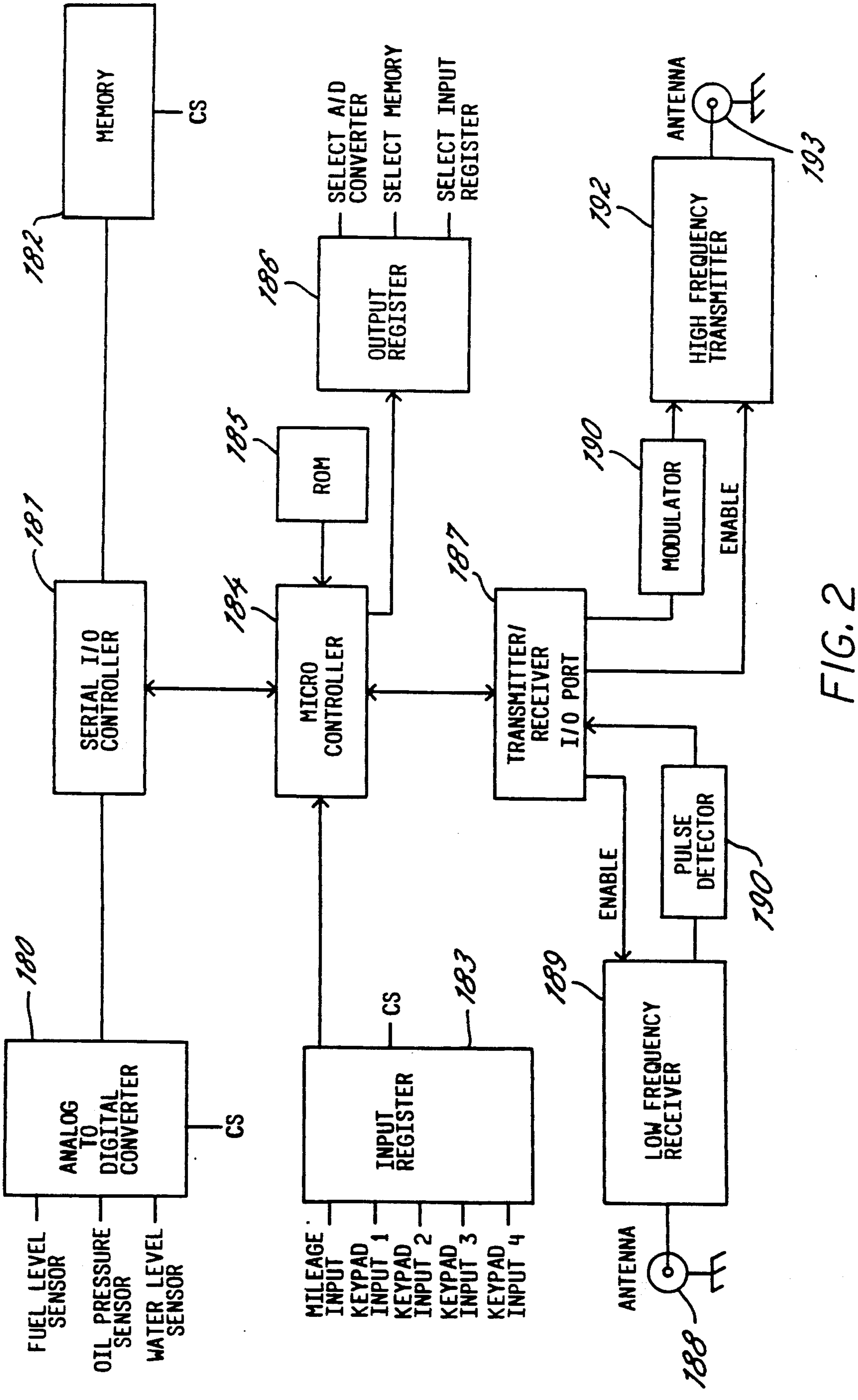
FIG. 2 is a schematic block diagram of an exemplary architecture for the control circuit of FIG. 1 on-board a vehicle to be processed in accordance with the invention.

To implement the control circuit (23) of FIG. 1, a small micro-controlled subsystem shown in FIG. 2 is provided on-board each vehicle for use in conjunction with the larger system of the invention. A micro-controller (184) running instructions from a ROM (185) controls the operation of the vehicle unit. The micro-controller (184) essentially operates as a sequencer responsive to externally received interrogation and programming signals. An example of a suitable device incorporating many of the elements in FIG. 2 is an 800 Series control oriented processor (COP) manufactured by National Semiconductor which includes an 8 channel A/D converter, a 1K-byte ROM memory, a 64-byte RAM memory and a microcontroller. Vehicle information which is supplied via an analog signal is supplied to an analog-to-digital converter (180). Analog vehicle parameters include, for example, information from the fluid level, oil pressure and water and fuel level sensors of FIG. 1. The analog-to-digital converter (180) works on a serial basis and provides the information from the various sensors to either a memory bank (182) or directly to the micro-controller (184) via a serial input/output port (181), depending on instructions from the micro-controller (184). An input register (183) is provided as an input to the micro-controller (184) for various digital sensor information, such as information from the mileage sensor (22) and the keypad. The micro-controller (184) also controls an output register (186) which enables and/or disables each of the analog-to-digital converter (180), the memory bank (182), and the input register (183) via respective chip select inputs (CS) which are provided by the output register (185). The micro-controller (184) also controls communication to and from the vehicle via a transmitter/receiver input/output port (187). Attached to the input/output port (187) is the low-frequency receiver (20) (FIG. 1) which is enabled or disabled by the micro-controller (184) via an enable line from the input/output port (187). The low-frequency receiver antenna (188) is connected to the low-frequency receiver (20) and supplies signals received from the low-frequency transmitter (19) (FIG. 1). Signals from the transmitter (19) received by the low-frequency receiver (20) are demodulated and decoded via a pulse detector (190) which supplies low-frequency digital information to the input/output port (187) in a serial manner.

Also attached to the input/output port (187) is the high-frequency transmitter (24a). Information which is transmitted from the micro-controller (184) through the input/output port (187) is supplied to the high-frequency transmitter (24a) via a high-frequency modulator (191) which converts the received digital information into a high-frequency analog signal. Similar to the low-frequency receiver (20), the high-frequency transmitter (24a) is enabled or disabled by the micro-controller (184) via an enable line from the input/output port (187). Connected to the high-frequency transmitter (24) is a high-frequency antenna (193) for transmitting high-frequency information from the vehicle (17) via high-frequency RF signals to the high-frequency receiver (24) which is ultimately connected to the local processor (11) as explained in connection with FIG. 1.

In keeping with the invention, data collected by the control circuit (23) is downloaded to the local processor (11) and delivered to the main computer (32) where it is entered into conventional data streams used by commercially available billing programs for generating a statement of account (32*a*). In commercially available automatic billing systems used for example by the vehicle rental industry, information such as mileage and fuel level is manually entered into the data stream via a keyboard input. The invention eliminates any need for the manual inputting of data so that the vehicle operator need not be held up by manual processing of information when he steps up to the front desk of an agency in order to close the rental transaction. Because of the automatic entry of the necessary vehicle parameters into the data stream of the billing program, a statement of account (32*a*) will normally be ready for the customers' review and acceptance when he reaches the transaction counter. Sensor data downloaded from the vehicle (17) is also made available to the main host computer (32) for listing the service needs of the vehicle and updating any historical database kept by the main computer for service records. In this regard, the service record (32*b*) may be prepared by commercially available routines that typically accept data from a keyboard input. In accordance with the invention, at least part of the service information provided to the service record routine is derived from the data link between the local processor (11) and the main computer (32). In a car rental environment, the service record (32*b*) provides an attendant with information regarding what servicing of a particular vehicle is needed before the vehicle is returned to the rental fleet. For example, the vehicle may require refueling or the refilling of the windshield fluid reservoir. Additionally, total mileage can be checked against a bench mark mileage recorded in a memory of the main host computer (32) for the purpose of scheduling periodic maintenance such as engine tune-ups and the like.

In an alternative application of the system of the invention, car repair businesses may utilize the system to compliment commercially available billing programs so as to automate recordation of requested repairs and the preparation of a statement of account for parts and services rendered. From a hardware basis, the invention is identical for either car rental or car repair applications. In this regard, the software of the invention as set forth in FIGS. 4-13 is also identical. However, by running different commercially available programs, the system serves to realize automation of either vehicle rental or car repair businesses.

Figure 3:
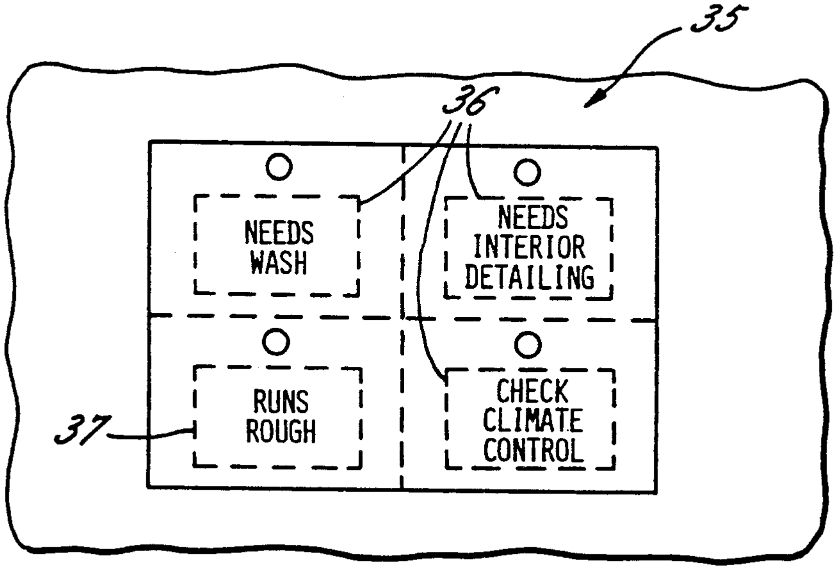
FIG. 3 is an enlarged plan view of a keyboard for mounting to the dashboard area of a vehicle processed by the system of FIG. 1.

Applicants expect that a keypad (35) mounted in the dashboard area of the vehicle (17) may usefully complement the basic sensor inputs to the control circuit (23) in a vehicle repair environment of the invention. As indicated in FIG. 3, such a keypad (35) may include a plurality of keys (36), each indicative of a particular repair or service need of the vehicle. As the operator of the vehicle becomes aware of repair or service needs not detectable by any sensors on-board the vehicle, a keystroke to the appropriate key (36) will enter data into a memory contained in the control circuit (23). Such data will at a later time be automatically downloaded when the vehicle is driven into the service area. For example, simple service requests such as cleaning the interior and exterior can be data entries provided by keystrokes as indicated by the exemplary keypad (35) of FIG. 3.

Virtually any repair or service required can be automated by way of additional keys on the keypad (35). For example, a keystroke to key (37) of the keypad (35) in FIG. 3 will provide a service report of a symptom requiring service to the vehicle—i.e., the engine runs rough. A keystroke to key (38) in the keypad (35) of FIG. 3 will indicate to the mechanic inspecting the automated service record that the climate control system is malfunctioning.

An alternative approach to the association of individual keys with specific repair or service requests is to provide a numbered keypad (not shown). Such a numbered keypad can be used to input coded messaged from an index of repairs and service requests. For example, a code entry of 0001 may indicate that the left front low-beam light needs replacement, whereas entry of the code 0002 indicates that the right front low-beam light requires replacement. By providing such a coded input, the number of possible service and repair requests that can be entered via a relatively small number of keys is vastly expanded.

Applicants note that the addition of the keypad to the system on-board the vehicle (17) is less likely to be successful in a car rental environment than in a vehicle repair environment since charges for repairs requested via the keypad may not necessarily be chargeable back to the customer. Therefore use of a keypad in a rental environment is susceptible to false entry of data. Because a customer will be charged for repairs resulting from keystrokes to the keypad in a car repair business, the integrity of the data entered into the keypad is likely to be much greater.

The flow diagrams of FIGS. 4-13 illustrate the functional features executed by the hardware of FIGS. 1-3. It will be appreciated by those skilled in the art of electronics that these functional features of flow diagrams 4-7 may be alternatively realized by a particular hardware arrangement of the affected devices or by a more sophisticated hardware/software relationship involving the micro-controller (184) or the local processor (11). It will be further appreciated that the flow diagrams of FIGS. 8-13 are executed by the local processor (11) and programmed using conventional programming techniques.

Figure 4:
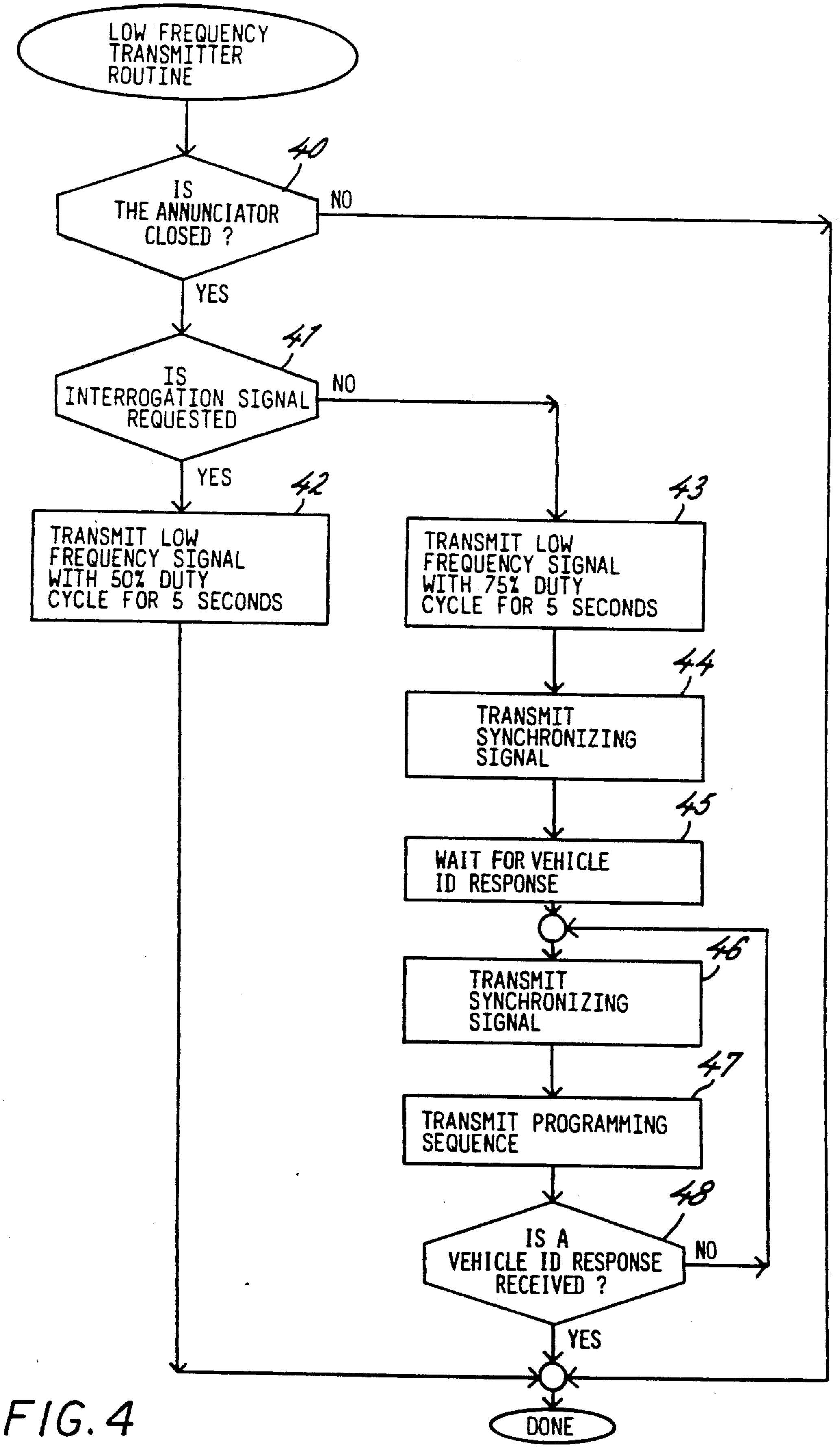
FIG. 4 is a flow diagram of the operational steps executed by a low-frequency transmitter associated with an annunciator located in a service area of the system illustrated in FIG. 1.

Turning to the flow diagrams and refering first to FIG. 4, there is shown a functional flow diagram of the routine executed by the low-frequency transmitter. An essential requirement for the operation of a low-frequency transmitter (19) is the presence of the vehicle within the site as sensed by the annunciator. Thus, the first step of the low frequency transmitter routine, step 40, is to check if the annunciator (18) is closed thereby indicating the presence of the vehicle (17) within the area of the station (10). If the annunciator (18) is not closed, thereby indicating that the vehicle (17) is not present within the station area, the low-frequency transmitter (19) is not activated and the routine branches to its end.

In the event that the annunciator (18) is closed, thereby indicating the presence of the vehicle (17) within the area of the station (10), the routine branches to step 41. In step 41, the low-frequency transmitter (19) determines whether a programming or an interrogation signal is requested from a control signal provided from the local processor (11). If it is determined that an interrogation signal is requested, then the routine branches to step 42, where a low-frequency signal with a 50% duty cycle is transmitted in the direction of the vehicle (17) for a period of five seconds. Such a transmission constitutes an interrogation signal, and when completed, the routine of the low-frequency transmitter (19) is finished.

In the event that the low-frequency transmitter (19) determines in step 41 that a programming signal rather than an interrogation signal is requested by the local processor (11), the routine branches to step 43 where a low-frequency signal with a 75% duty cycle is transmitted for a period of five seconds. Transmission of such a tone initiates a programming mode in that the tone is recognized by the low-frequency receiver located on the car. After the tone for initiating the programming mode is transmitted, the routine branches to step 44 where a synchronizing signal is transmitted to the vehicle (17). Next, in step 45, the low-frequency transmitter (19) waits for a signal from the local processor (11) indicating that an identification signal has been received from the vehicle (17) within the station (10). After the local processor (11) has received the identification signal, the routine continues to step 46 in which a synchronizing signal is transmitted in the direction of the vehicle (17). Next, in step 47, a programming sequence is transmitted in the direction of the vehicle (17) by the low-frequency transmitter (19). Such a programming sequence contains, for example, commands or instructions for the vehicle such as the resetting indicators (e.g., trip mileage meter) or storing data in a memory device located on the vehicle for later access (e.g., a service record).

After the transmission of the programming sequence the routine branches to step 48 wherein the vehicle (17) acknowledges the safe receipt of the programming sequence. In the event that a complete programming sequence is not timely received by the vehicle (17) after a programming sequence synchronizing signal is sent in step 46, the vehicle will not transmit a vehicle identification signal, and thus, the routine will branch back to step 46 and re-transmit a synchronizing signal in step 46 and the programming sequence in step 47. Re-transmission of the synchronizing signal and the programming sequence will continue until a valid vehicle identification signal is received, indicating that the programming sequence has been successfully received by the vehicle and the routine of the low-frequency transmitter (19) is completed.

Figure 5:
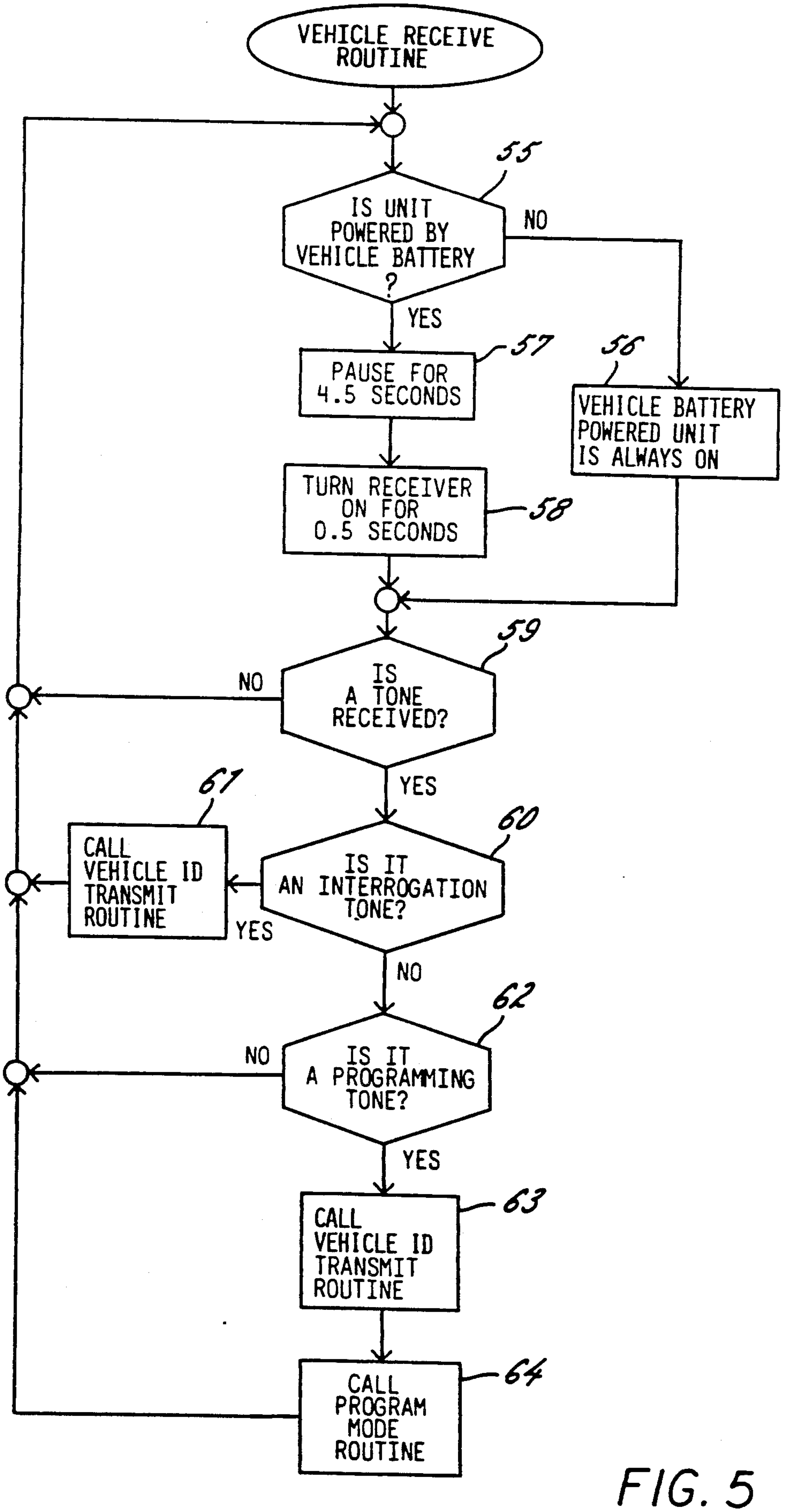
FIG. 5 is a flow diagram of functions executed by electronics on-board a vehicle within the service area in response to interrogation initiated by the low-frequency transmitter and annunciator.

Referring to FIG. 5, there is shown the routine for execution by the low-frequency receiver (20) and/or the micro-controller (185) located on board the vehicle (17). Beginning in step 55, it is determined whether the on-board unit is powered by its own battery or by the battery of the vehicle (12). If the unit is powered by the battery of the vehicle (17), it is always on as indicated by step 56. If the on-board unit is powered by its own battery, the procedure branches to step 57 where the receiver pauses for approximately 4.5 seconds as part of an energy-saving subroutine. Next, in step 58, the receiver (20) turns on for approximately one-half second and then branches to step 59 where it determines whether a tone has been received. If a tone has not been received, the routine of the receiver (20) branches back to step 55, completing an energy conserving loop which is continuously executed by the receiver (20). Since an interrogation or a programming signal from the low frequency transmitter is transmitted for a duration of five seconds, a pause for 4.5 seconds in step 57 combined with enabling the receiver (20) for 0.5 seconds allows for a sufficient window of "on time" for the receiver (20) that the five second transmission from the low-frequency transmitter (19) will be detected by the low-frequency receiver (20).

If a tone is received by the low-frequency receiver (20), the routine branches to step 60 where it determines whether or not an interrogation tone has been received. If an interrogation tone has been received, the routine branches to step 61 where a subroutine for transmitting the vehicle identification signal is called, and vehicle identification and operating parameter information are transmitted by the high-frequency transmitter **(24*a*) and the routine loops back to step 55. Otherwise, in step 60 if it is determined that the tone received was not an interrogation tone, the routine branches to step 62 where it determines whether the tone is a programming tone. If the tone is not a programming tone, execution of the routine branches back to step 55. If it is determined that the tone is a programming tone, execution of the routine branches to step 63 where the subroutine for transmitting the vehicle identification signal is called and vehicle identification and operating parameter information is transmitted via the high-frequency transmitter (24). In step 64, a programming mode subroutine is called for the low-frequency receiver (20). After a complete programming sequence is received by the low-frequency receiver (20) of the vehicle (17), the instruction or commands encoded therein are carried out by the processor (23) on-board the vehicle. Such instructions are contemplated as involving the storage or modification of particular values or information in a an on-board digital memory device. After the program mode subroutine is completed, the main routine for the receiver (20) branches back to step 55 and continues looping, looking for a tone from the low-frequency transmitter (19) associated with the annunciator (18)**.

A routine executed by the high-frequency transmitter **(24*a*) and/or the micro-controller (184) on-board the vehicle (17) is initiated in response to an interrogation request from the low-frequency transmitter (19) and detected by the low-frequency receiver (20) on-board the vehicle (17). This routine is responsible for transmitting vehicle identification and operating parameter information via the high-frequency transmitter (24*a*) located on the vehicle (17). The routine begins in step 70 of FIG. 6 by transmitting an initial synchronizing signal to prepare the high-frequency receiver (14)** for receipt of a message.

In the illustrated embodiment of the invention, the synchronizing signal is comprised of a 49 mega-hertz carrier which is modulated by a 500 to 1000 hertz signal with a 50% duty cycle. After the synchronizing signal is sent, the routine branches to step 71 in which the vehicle identification signal is transmitted. Using a pulse-width modulation technique, digital information relating to the vehicle identification signal is transmitted in a serial format via the high-frequency transmitter **(24*a*) on-board the vehicle (17). Using this technique, digital ones are represented by a modulated signal with a 75% duty cycle, and digital zeros are represented by a modulated signal with a 25% duty cycle. Using this technique the vehicle parameter information is also transmitted beginning with step 72 wherein it is determined whether the gas sensor (21*a*) is installed on the vehicle (17) and attached to the high-frequency transmitter (24*a*) so as to allow the reading and downloading of the amount of gasoline in the vehicle. If it is determined in step 72, that the gas sensor (21***a*) is present, the routine branches to step 73 wherein the gas level is read from the gas sensor (21*a*) and it is sent via the high-frequency transmitter (24*a*).

If it is determined in step 72 that the gas sensor (21*a*) is not present, the routine branches to step 74 wherein it is determined whether the mileage sensor (21*b* ) is present on the vehicle (17)). If the mileage sensor (21*b*) is present, the routine branches to step 75 where the mileage information is read from the mileage sensor and it is downloaded to the high-frequency receiver (24) via the high-frequency transmitter (24*a*). If the mileage sensor (21*b*) is not present on the vehicle (17) the routine branches directly to step 76 where it is determined whether a key pad device (see FIG. 3) is installed in the vehicle (17) and whether it is connected as an input to the high-frequency transmitter (24*a*). If a key pad device (21*e*) is connected, the routine branches to step 77 and the information entered from the key pad is read and sent via the high-frequency transmitter (24*a*). If the keypad device (21*e*) is not connected, the routine branches directly to step 78 wherein it is determined whether a washer fluid sensor (21*c*) is present on the vehicle (17). If a windshield washer fluid level sensor (21*c*) is present on the vehicle (17), the routine branches to step 79 wherein information from the windshield washer fluid sensor is read and downloaded via the high-frequency transmitter (24*a*).

In a similar manner as set forth for the foregoing sensors, information from a whole variety of various sensors, any of which may be installed on the vehicle (17), may be downloaded to the local processor (11) in the message containing operating parameter information. These various additional operating parameters may be derived from conventional sensors and provide information regarding oil transmission and radiator fluid level and the state of the battery and the electrical fuses. The routine checks to determine which of these sensors is present, and reads the information presented by the sensors and downloads it as operating parameter information. It will be apparent that any number of additional or different sensor devices beyond those mentioned here may provide various other operating parameter information in the download message.

Figure 6:
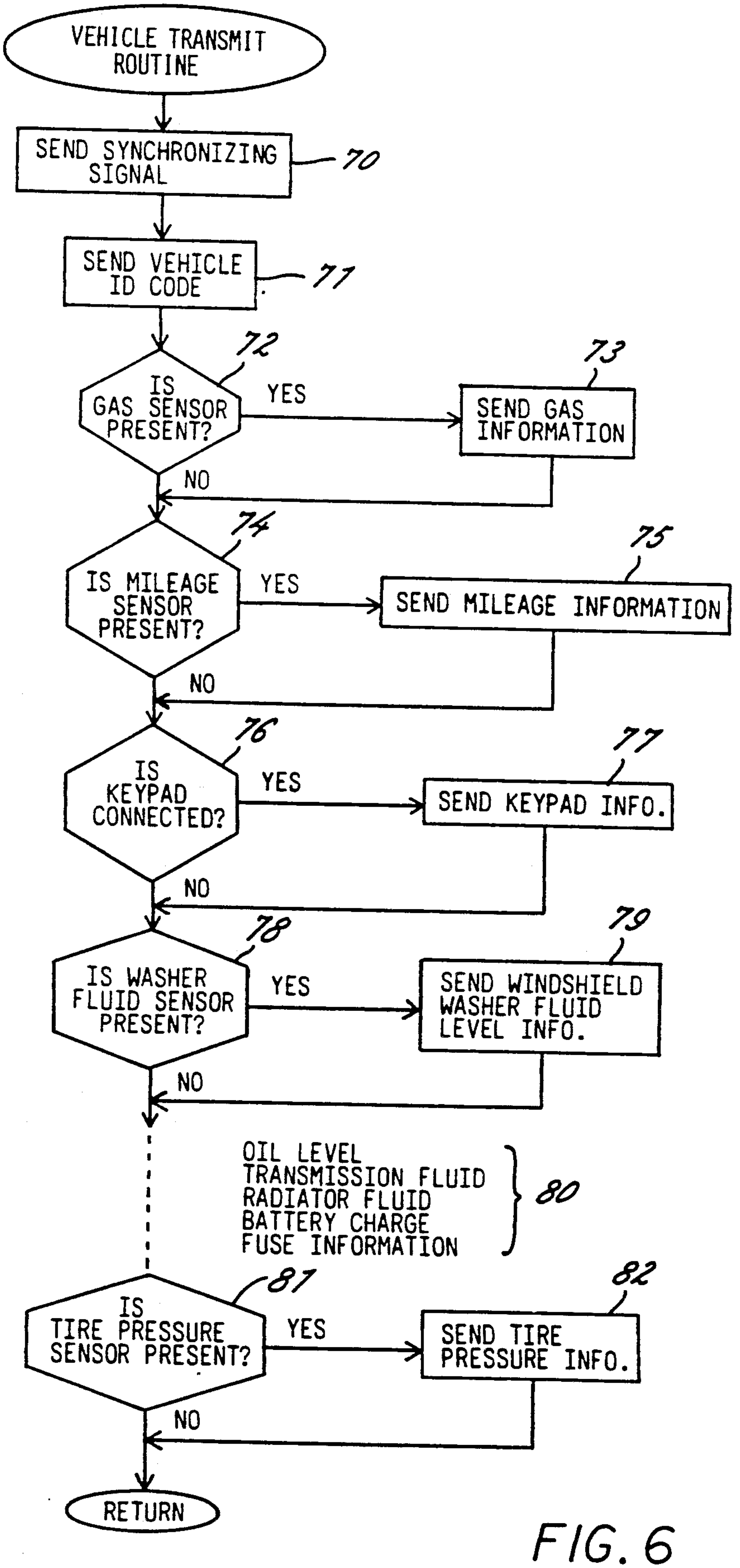
FIG. 6 is a flow diagram of the functions executed by the electronics on-board the vehicle in response to the recognition of an interrogation signal from the low-frequency transmitter and annunciator located within a service area.

According to the illustrated embodiment, the last sensor checked is a tire pressure sensor (not shown in FIG. 1) as indicated by step 81 in FIG. 6. If the tire pressure sensor is present, the routine branches to step 82 and the tire pressure information is read from the sensor and downloaded via the high-frequency transmitter (24*a*). After steps 81 and 82, the routine has completed the transmission of all of the sensor and operating parameter information via the high-frequency transmitter (24*a*), and the routine is ready to begin a new cycle.

Figure 7:
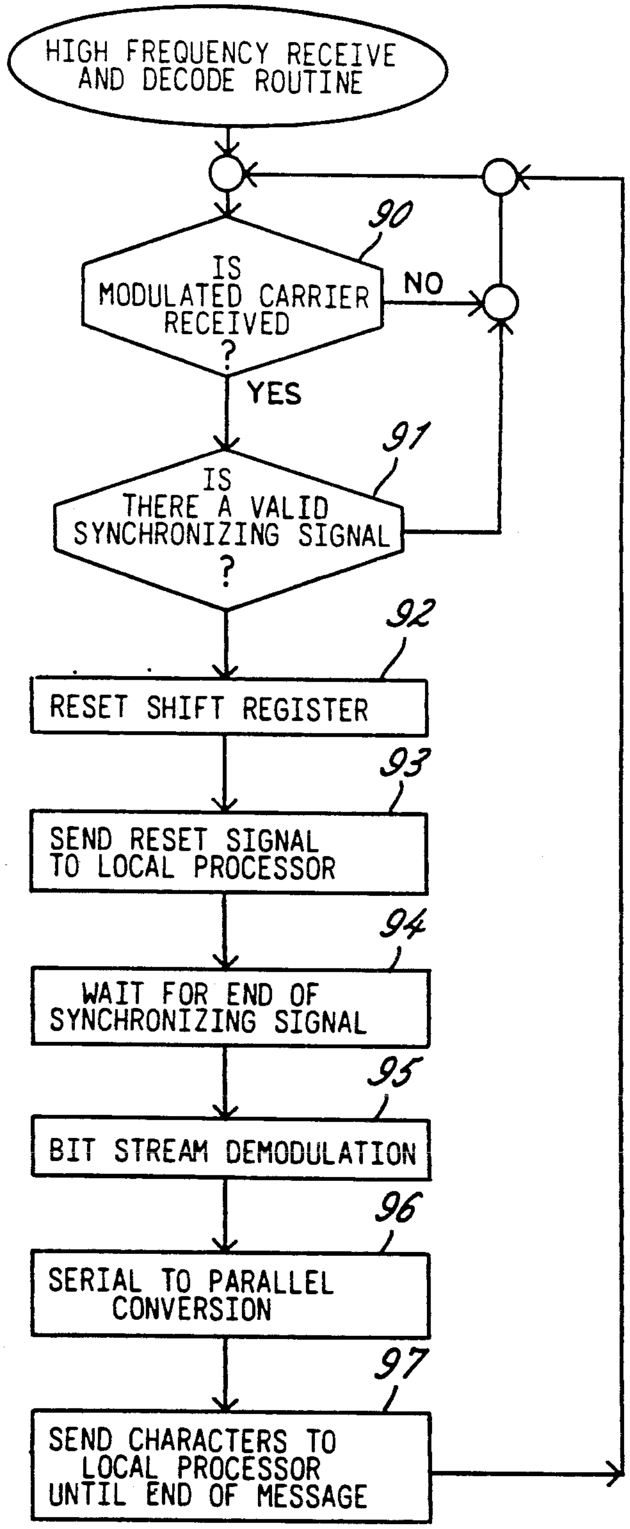
FIG. 7 is a flow diagram of the functions executed by a high-frequency receiver located in a service area and an associated local processor for receiving data downloaded from the electronics on-board a vehicle in a service area.

Turning now to FIG. 7, a high-frequency receive and decode routine is executed by each of the interface modules (25) in conjunction with the local processor (11). The routine is responsible for taking the serially received intermediate frequency information from the high-frequency receiver (24), converting it into a digital message format and transmitting the information to the local processor (11). Beginning with step 90, the interface module (25) determines whether a modulated carrier is being received. If a modulated carrier is not being received, the routine loops around to the beginning and continues such looping until a modulated carrier is received. Upon receipt of a modulated carrier, the routine branches to step 91 where the received signal is checked to determine whether a valid synchronizing signal is being received. As mentioned previously, a valid synchronizing signal preferably comprises a carrier modulated at a 500 to 1000 hertz signal, with a 50% duty cycle.

If a valid synchronizing signal is not detected in step 91, the routine branches to the beginning of the routine and checks again for a modulated carrier. Otherwise, detection of a valid synchronizing signal in step 91 causes the routine to branch to step 92 wherein a shift register (not shown) located within the interface module (25) is reset for the bit-by-bit receipt of the signal information from the high-frequency receiver (24). Next, in step 93, a reset signal is sent to the local processor (11) which signifies the beginning of a new message. In step 94, the interface module (25) waits for the end of the synchronizing signal. Since a pulse-width modulation technique is being utilized, the end of the synchronizing signal will be determined by the receipt of the carrier which is modulated by a signal with either a 25% or a 75% duty cycle. The receipt of a signal with either of these two duty cycles denotes the beginning of a message and causes the routine to branch to step 95. In step 95, the serially received information from the high-frequency receiver (24) is demodulated into a bit stream. This bit stream is then fed into the shift register (not shown) on a bit-by-bit basis in step 96. In this manner, the serial information is converted to parallel and made available for transmission to the local processor (11).

Each time the shift register is filled by bits serially received by the high-frequency receiver (24), a character is complete and it is then sent to the local processor (11). Preferably, the transmission of characters to the local processor (11) is done using a conventional transmission technique which utilizes will known hand-shaking and reset signals. In this manner, each character of the message is converted from a serially received format to a digital character format and transmitted to the local processor (11). After all the characters of the message have been sent, the routine branches back to the beginning and continues looping, looking for a modulated carrier.

Figure 8:
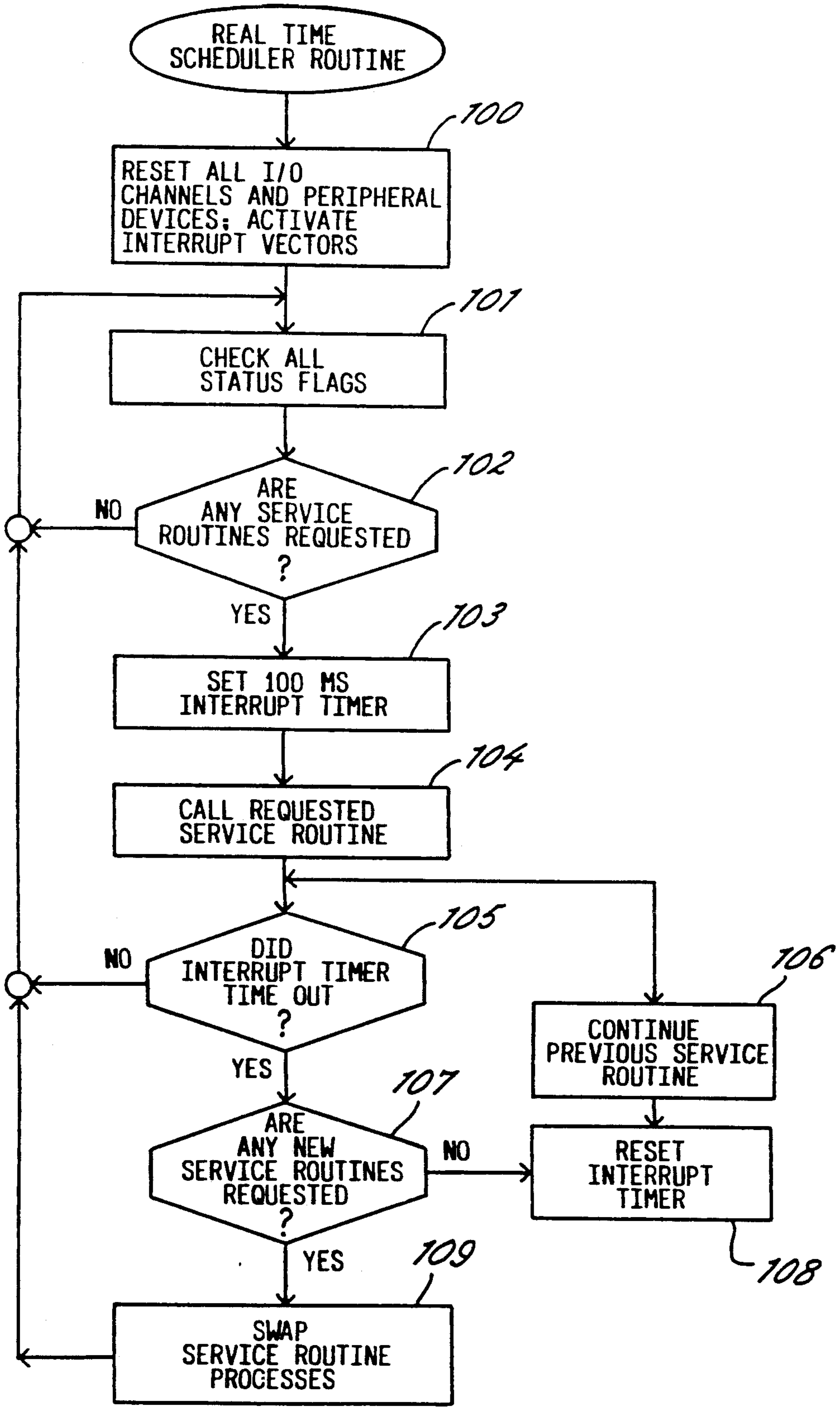
FIG. 8 is a flow diagram of a background routine executed by the local processor of the system illustrated in FIG. 1 for the purpose of servicing the various input/output ports of the processor.

The local processor (11) is at the heart of the present invention, providing control and processing functions which are vital to the gathering of vehicle information and processing it to provide maintenance and transaction information. Among the functions provided by the local processor (11) are the receipt of information from the interface module (25), the transmission of information to and from the main host computer (32), the servicing of the local keyboards (30) and (31) and the servicing of various internal processes. In order to provide all these functions, the local processor (11) runs a real time multi-tasking scheduler routine which organizes, processes view and controls the servicing of various routines executed by the local processor. The real-time scheduler routine run by the local processor (11) is shown in FIG. 8 and begins at step 100 when the local processor is reset when it is first turned on. Resetting initializes all input/output (I/O) channels and peripheral devices of the processor in addition to setting and activating various interrupt vectors as is generally known in software programming.

By using a number of status flags, the local processor (11) determines which devices are requesting service. For example, when the main host computer (32) has information which it wishes to send to the local processor (11), a status is set. Similarly, a status flag is used to indicate to the local processor (11) when one of the local keyboards (30), (31) has information which it wishes to transmit to the local processor. In step 101, the local processor checks to see which ones of the flags, if any, have been set to indicate a request of service. In step 102, if it is determined from the status of the various flags that no service routine has been requested, the routine branches back to step 101 to check the status flags again. Otherwise, if any service routines have been requested in step 102, then the routine branches to step 103 in which a 100 millisecond interrupt timer is started. A 100 millisecond interrupt timer is used to limit the amount of time which will be spent in one service routine, so as to prevent the system from being infinitely delayed in the event a fault occurs while a routine is being executed. Additionally, the 100 millisecond interrupt timer insures that a request for a different service routine will not go unnoticed for more than 100 milliseconds. Such a feature is very important in the context of a service routine for the interface module (25), which involves information that is currently being received from the automobile and will only be available for a finite amount of time. Thus, the interrupt timer insures that the information from the interface module (25) is read before new information is written over the old and lost.

After the interrupt timer is set in step 103, the requested service routine is called in step 104. Upon interruption or completion of the requested service routine, the main routine will determine at step 105 whether the interrupt timer has timed out. If the interrupt timer did not time out, the routine necessarily has been completed and the main routine branches back to its beginning where the status flags are checked. Otherwise, if it is determined in step 105 that the interrupt timers did time out, the routine branches to step 107 where the status flags are checked to determine whether a new service routine has been requested. If no new service has been requested, the process branches first to step 108 where the interrupt timer is reset and then to step 106 where the previously running service routine is continued. As in step 104, the service routine will continue to execute until either it is completed or the interrupt timer times out as determined in step 105. In step 107, if it is determined that a new service routine has been requested, the main routine moves to step 109 wherein the the new service routine is interrupted and the real-time scheduler routine branches back to step 101.

Figure 9:
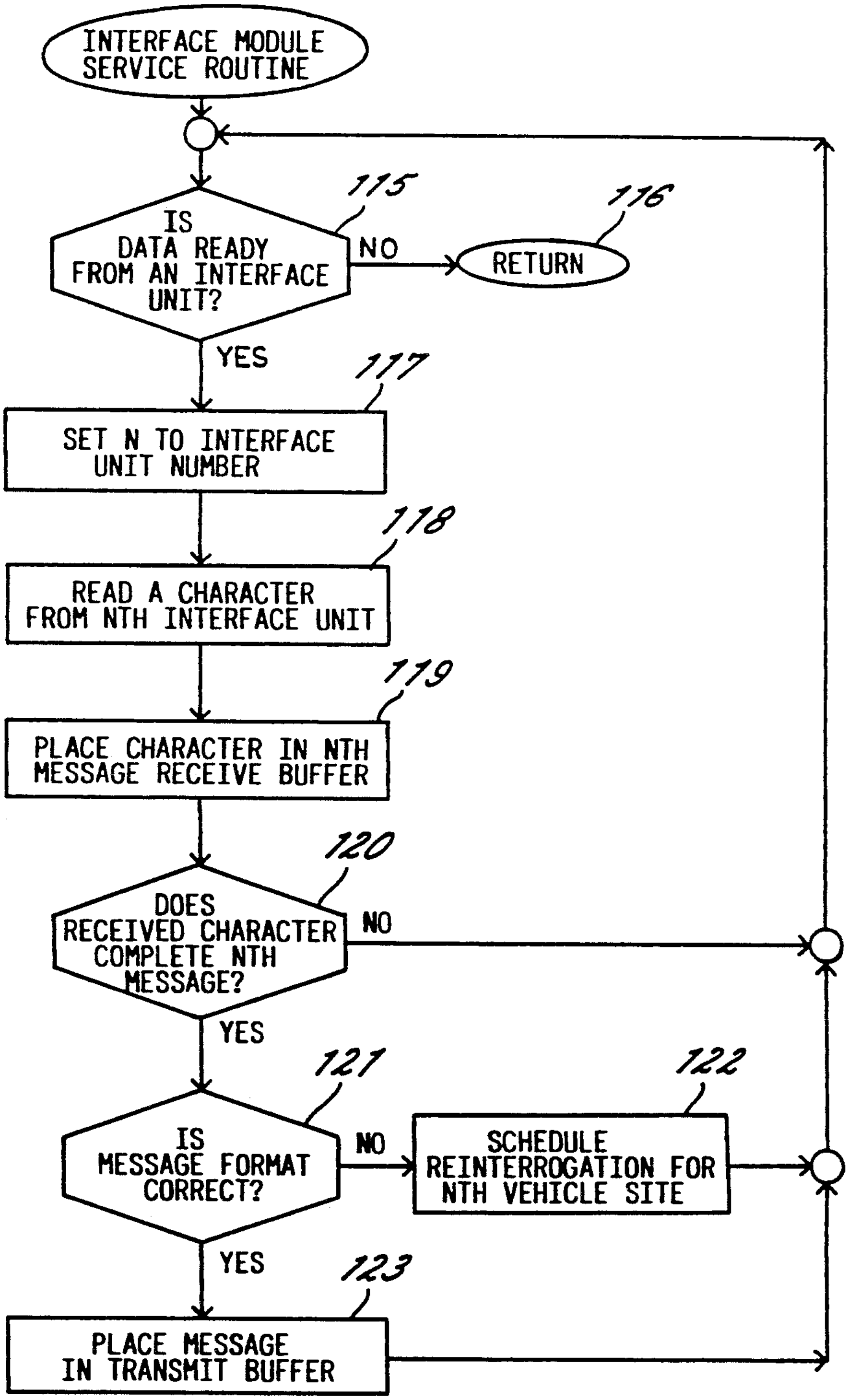
FIG. 9 is a flow diagram of a routine executed by the local processor of FIG. 1 for receiving data from one of the service areas of the system.

One of the most important service routines executed by the local processor (11) is the service routine for the interface module (25). Servicing of a request from the interface module (25) involves determining from which one of the interface modules the request originated and then reading information, typically in the form of characters from the requesting interface unit. The service routine in the interface module (25) is shown in FIG. 9 and begins with step 115 which determines whether data is ready from one of the modules. If there is no data ready from a module the routine returns in step 116. Otherwise, the routine branches to step 117 where the variable N is assigned the value of the interface module. This number is used to identify which interface module and ultimately which station (10), (13) or (14) is the origin of the message.

After the number of the interface modules is set, the routine first branches to step 118 where a character is read from the selected module and then branches to step 119 where the character is placed in a memory buffer in the local processor (11). The memory buffer is partitioned such that there is an area dedicated to each of the interface modules attached to the local processor (11) through the input ports (12), (15) and (16). The memory buffer serves as temporary storage for messages which are being received from a particular interface module.

After the character has been read from the selected interface module and placed in its associated area of the memory buffer, the routine continues to step 120 where it is determined whether the received character has completed the message. If the last received character does not complete the message, the routine branches back to the beginning at step 115 where the interface module is checked to see if any additional data is ready.

If the last character received in step 120 completes the message, the routine branches to step 121 where the massage format is checked. This check involves determinations such as whether the message length is correct and whether the various values contained within a message are within the predetermined acceptable range. For example, values indicating a negative fuel level will determine that the message is incorrectly formatted. Similarly, a vehicle identification number which does not contain a sufficient number of characters indicates that the message is incorrect.

If the local processor (11) determines that the message format is incorrect in step 121 or the values contained within the message do not fall within an acceptable bound, the routine branches to step 122 where a re-interrogation is schedules for the associated station (10), (13) and (14) in order to repeat the message with a correct format. After the re-interrogation is scheduled in step 122, the routine branches back to the beginning at step 115 where the interface module is checked to see if data is ready to be received. If in step 121 it is determined that the message format is correct, the routine branches to step 123 where the message is placed in a transmit buffer for transmission to the main host computer (32) and any attached output peripheral devices such as a printer or a display screen (not shown). After the message is placed in the transmit buffer in step 123, the routine branches back to the beginning at step 115 where the interface unit are checked to see if data is ready from any of the interface modules.

Figure 10:
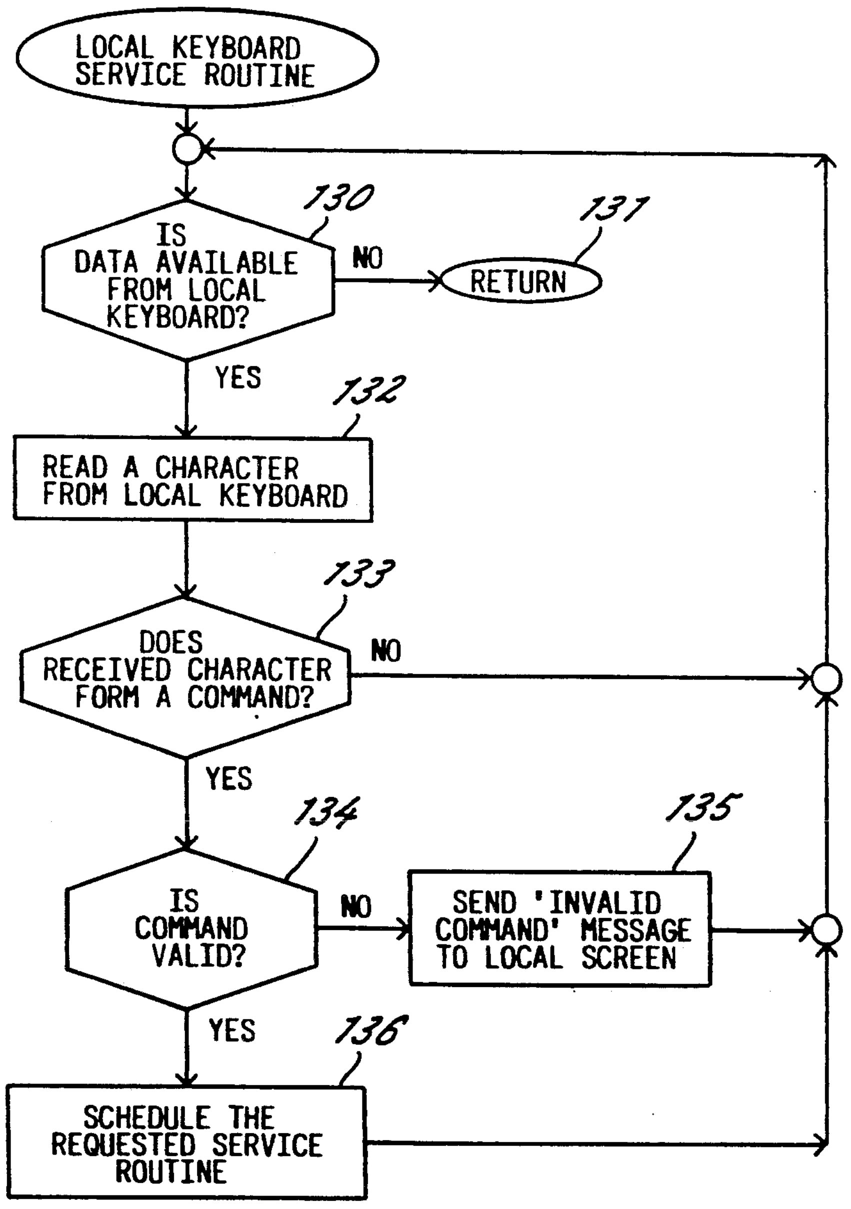
FIG. 10 is a flow diagram of a service routine executed by the local processor in response to the presentation of data at an input port connected to a local keyboard.

Turning now to FIG. 10, there is shown the local keyboard service routine which is run by the local processor (11) to receive and analyze information from one of the local keyboards (30) or (31). Typically, such information will be in the form of messages containing commands or requests for the local processor (11). The local keyboard service routine begins in step 130 where it is determined whether data is available from the local keyboard. If there is no data available from the keyboard, the routine simply returns in step 131 to the beginning.

If it is determined in step 130 that data is available from the local keyboard, the routine branches to step 132 where a character is read from the keyboard by the local processor (11). After the character has been read, the routine continues to step 133 where it is determined whether the received character forms a command. This determination is based in part upon the type and number of previously received characters which may comprise the beginning portion of a command. If in step 133 it is determined that the received character is not a command, (e.g., not enough characters have been received to complete a command), the routine branches back to the beginning and checks again to see if more data is available from the local keyboards (30) or (31). If, in step 133 the received character forms a command, the routine branches to step 134 where it is determined whether the command is valid. This determination is made by comparing the received command with a predetermined list of valid commands stored in memory at the local processor (11).

If the received command is determined to be invalid (i.e., it does not conform to one of the predetermined command in the list of valid commands), the routine branches to step 135 wherein a message is sent to the local screen indicating the command is invalid. The routine then returns to the beginning at step 130 where it is checked to see if more data is available from the local keyboard (30) or (31). Otherwise, in step 134 if it is determined that a valid command has been received, the routine branches to step 136 where the command is decoded and it is scheduled as a request for one or more service routines run by the local processor (11). After the command has been scheduled in this manner, the routine branches back to the beginning in step 130 where it is checked again to see if data is available from a local keyboard (30) or (31).

Figure 11:
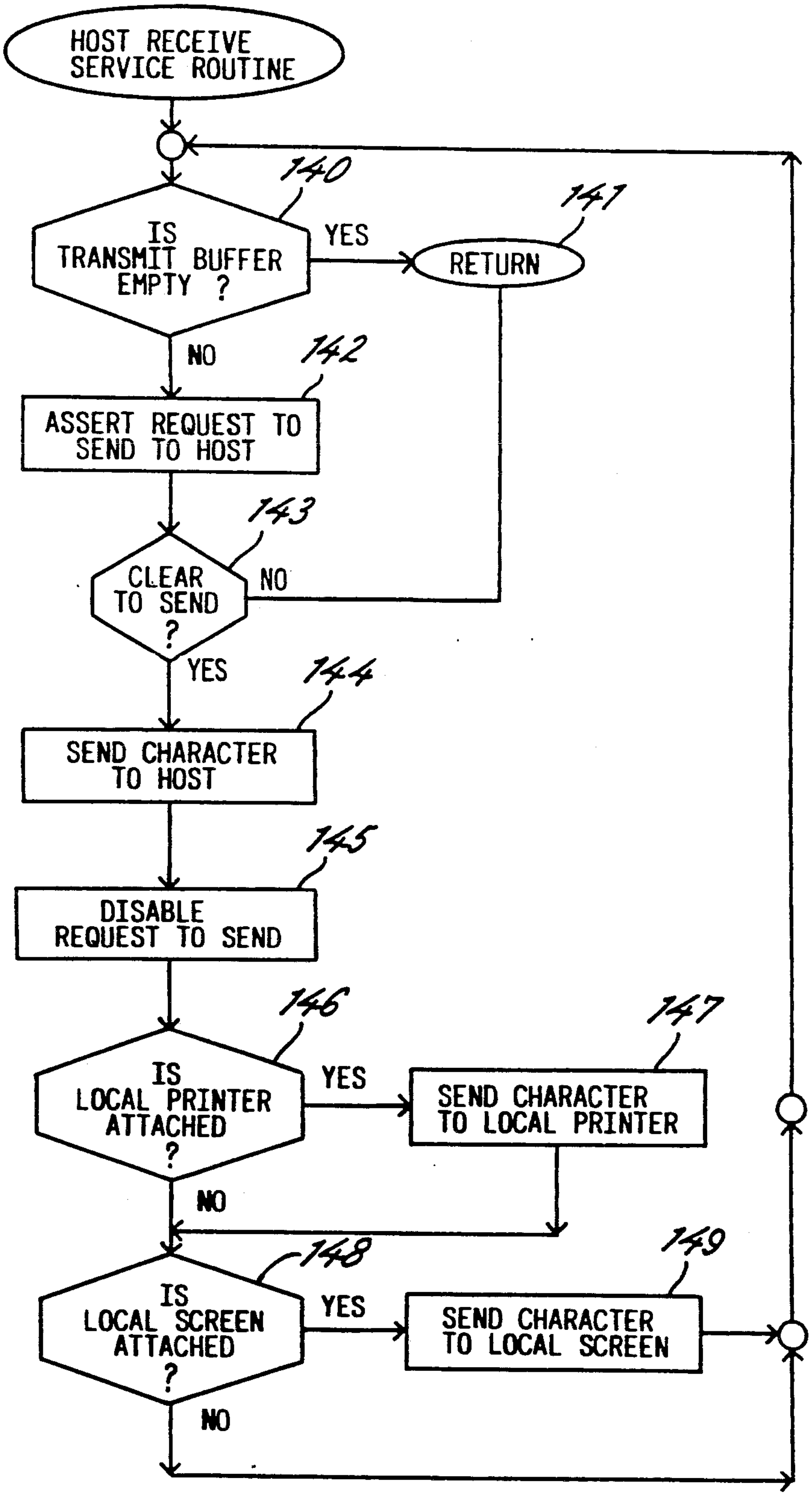
FIG. 11 is a flow diagram of a service routine executed by the local processor of FIG. 1 for receiving data from a host main computer.

Another routine which is run by the local processor is the host receive service routine of FIG. 11 which is responsible for transmitting information residing in the transmit buffer (not shown) of the local processor to the main host computer (32). The information in the transmit buffer for transmission to the main host computer (32) typically includes messages collected from various message buffers inside the local processor (11) and associated with other service routines.

The host receive service routine begins in step 140 where it is determined whether the transmit buffer is empty. If the transmit buffer is empty, the routine branches to step 141 and returns since there is no information ready to be transmitted to the main host computer (32). Otherwise, in step 140, if the transmit buffer is not empty, the routine branches to step 142 where a request-to-send line running between the local processor (11) and the main host computer (32) is asserted, thereby signifying that the local processor wishes to send information to the main host computer. In a response to the assertion of the request-to-send line by the local processor (11), the host computer (32) signals the local processor in step 143 as to whether the data lines of the RS232C bus are clear to send.

If the main host computer (32) indicates that the datalines are not clear to send, communications cannot be set up between the main host computer and the local processor, and the routine returns via step 141. If, however, in step 143 the main host computer (32) indicates that it is clear to send, the routine branches to step 144 where a character is transmitted to the host computer from the local processor. After the character has been sent, the request to send line is disabled in step 144, and the routine goes to step 146 where it is determined whether the local printer (29) is attached to the processor (11). If the local printer (29) is attached, the routine branches to step 147 where the character from the transmit buffer is sent to the printer. If a display screen (28) is attached to the local processor (11) as determined in step 148, the routine branches to step 149 where the current character from the transmit buffer is sent to the screen.

After the current character in the transmit buffer has been sent to the main host computer (32) and to the printer (29) and/or display screen (28) if attached, the routine returns back to the beginning in step 140 where the next character in the transmit buffer is examined If the previously transmitted character was the last in the transmit buffer, it will be found to be empty and the routine will return via step 141. Otherwise, if the previously transmitted character was not last, then the routine will branch to step 142 and attempt to transmit the character to the main host computer (32). This process will continue until all the characters in the transmit buffer have been transmitted to the main host computer (32).

Figure 12:
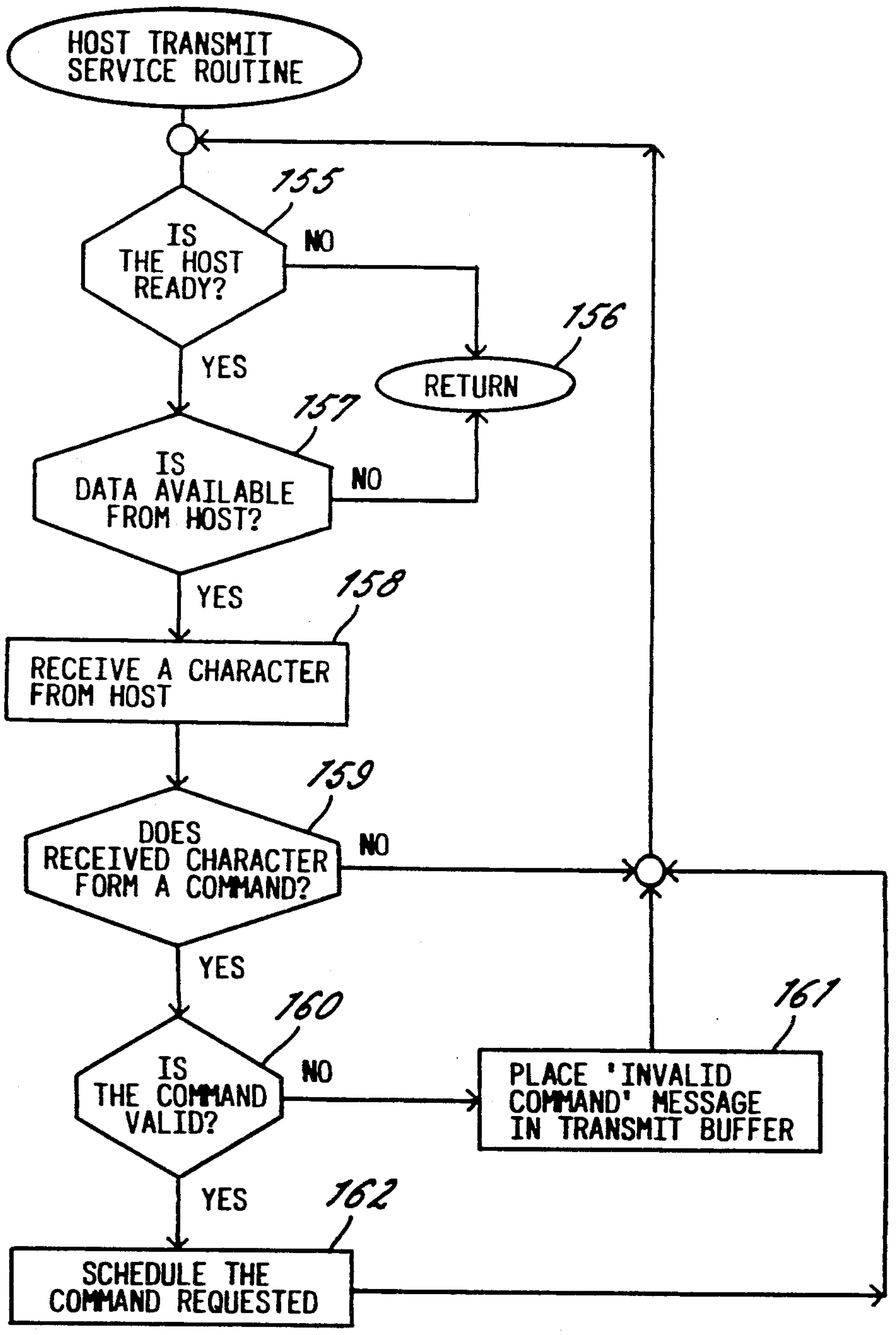
FIG. 12 is a flow diagram of a service routine executed by the local processor of FIG. 1 for transmitting data to the host main computer.

A host transmit service routine of FIG. 12 is run by the local processor (11) and is responsible for receiving characters which are transmitted from the main host computer (32). The characters received typically will be gathered to form a command which is to be executed by the local processor (11). The routine begins in step in 155 where it is determined whether the main host computer (32) is connected and in a ready state. If the main host computer (32) is not ready, the routine branches to step 156 where it returns. If the main host computer (32) is in a ready state, the routine branches to step 157 where it is determined whether data to be sent to the local processor (11) is available for transmission from the main host computer. If data is not available for transmission, the routine branches to step 156 and returns since there are no characters which are ready to be received at this time. If data is available for transmission from the main host computer (32), the routine branches to step 158 where the local processor (11) receives a character from the main host computer.

In step 159, it is determined whether the received character forms a command. If the received character does not complete a command, the routine branches to the beginning at step 159 where it tries to receive another character from the main host computer (32). If the received character does form a command, however, the routine branches to step 160 where it is determined whether the command is valid. This validation is carried out by comparing the completed command with the predetermined list of valid commands stored by the local processor (11). If the command is determined to be invalid, the routine branches to step 161 and a message indicating receipt of an invalid command is placed in the transmit buffer of the local processor (11) for transmission to the main host computer (32). Upon receipt of a valid command in step 160, the routine branches to step 162 where the command requested by the main host computer (32) is scheduled for execution in the local processor (11). After the scheduling is completed, the routine branches back to the beginning as step 155 where the local processor (11) checks if more characters are ready to be transmitted from the main host computer (32).

Figure 13:
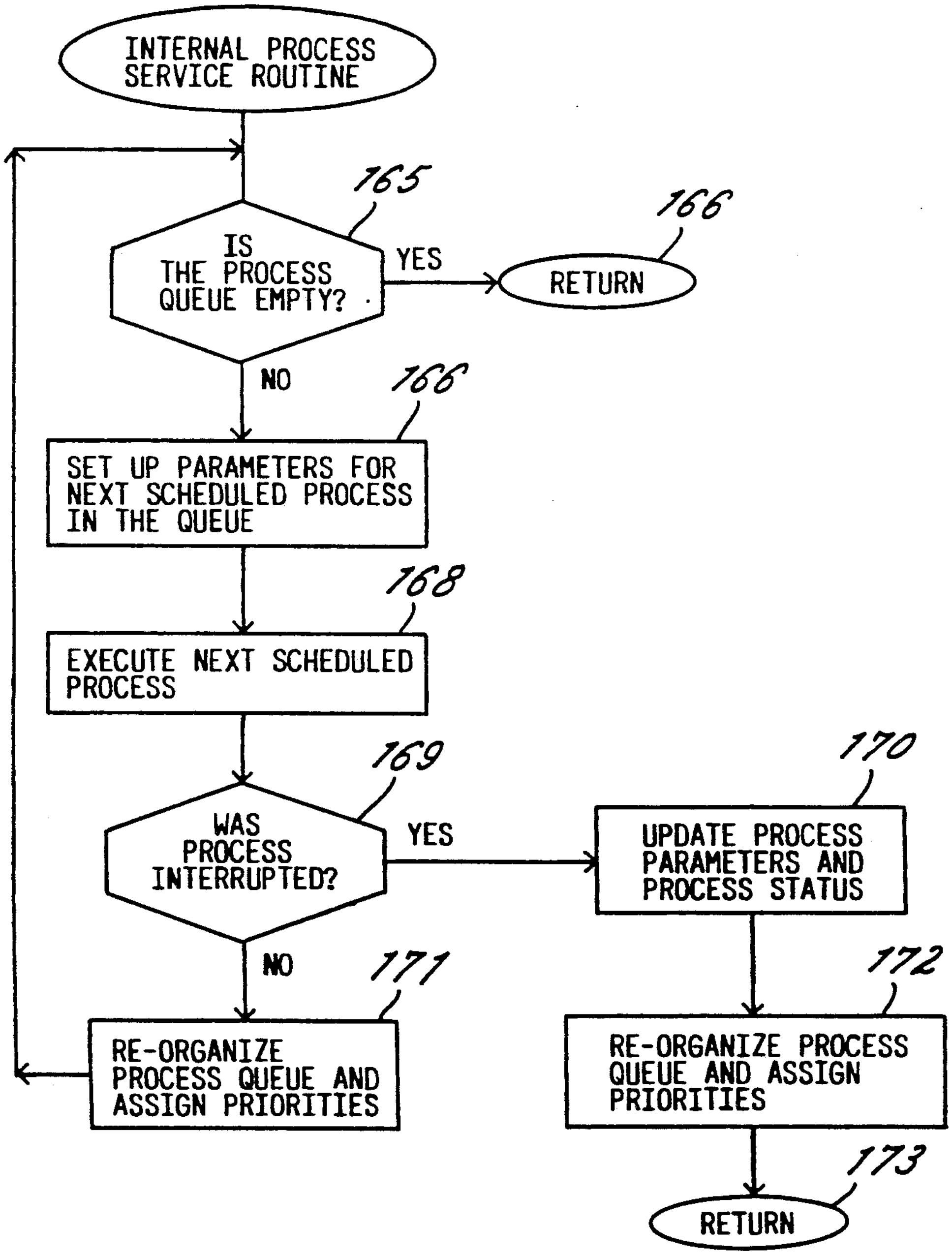
FIG. 13 is a flow diagram of a service routine executed by the local processor of FIG. 1 for scheduling the execution of various internal processes.

In addition to the various routines which interface and establish communication sessions with the local processor, a number of internal routines may be run on the local processor (11) on a timeshared basis with the other routines. As generally known in the art, internal processes may involve, for example, the copying of a message from a message buffer to the transmit buffer, assembling and disassembling messages and their component parts from formats in which the messages are received to formats in which the messages are expected to be transmitted, and running various general housekeeping or diagnostic procedures within the local processor (11) itself. The internal process routine of FIG. 13 is executed by the local processor (11) for the purpose of scheduling the internal routines. It may also be responsible for converting the messages from one format to another, which would include deleting, appending or otherwise modifying header and trailer information attached to the messages and inserting or removing various error correcting and/or detecting information possibly included in various stages of communication of the messages.

The internal process routines are preferably stored in a queue which is organized according to priority. The internal process service routine of FIG. 12 is responsible for organizing and prioritizing the queue and scheduling new processes into the process queue. The routine begins in step 165 by examining the process queue to determine if it is empty. If the process queue is empty then the routine branches to step 166 and returns, since there are no internal processes which need to be run at this time. If the process queue is not empty, the routine branches to step 167 where the parameters necessary to run the process routine are set off and initialized. In step 167, the process routine begins execution.

When execution of the process is halted, the routine branches to step 169 where it is determined whether the process is interrupted. If the process was interrupted, the routine branches to step 170 where the process parameters and process status of the previously running process are updated and stored back in the queue. Then , in step 172, the process queue is reorganized and priorities are reassigned and the routine returns in step 173. If in step 169 it is determined that the process was not interrupted, i.e., the previously running process routine has completed, the service routine branches to step 171 where the process queue is reorganized and the priorities relating to the various processes in the queue are reassigned. The service routine then branches back to the beginning at step 165 to determine if any more processes are available for running.

From the foregoing it will be appreciated that a novel system is disclosed for automating vehicle-related transactions such as rental and repair businesses. By providing a system which automatically retrieves information from a vehicle and prepares a statement of account and a service request therefrom, simple transactions can be accomplished in an efficient manner, eliminating customer waiting and associated aggravation.

We claim:

1. At a site for processing vehicles, a system for automatically identifying vehicles, assimilating data from an identified vehicle, correlating said data with predetermined data and providing a hard copy indicative of a transaction between an operator of the vehicle and another party, said system comprising in combination:

an annunciator for automatically detecting the presence of a vehicle at said site;

radio frequency transmitter means at said site responsive to said annunciator for transmitting an interrogation signal to said vehicle;

means on-board said vehicle for sensing data indicative of operation conditions of said vehicle and a memory containing data identifying said vehicle;

radio frequency transmitter and receiver means on-board said vehicle;

said means on-board said vehicle being responsive to said interrogation signal detected by said transmitter and receiver means for downloading via said transmitter and receiver means said vehicle identification data and said sensed data to processor means within said site;

said processor means including means for receiving said downloaded data from said vehicle; and means associated with said processor means for correlating said downloaded data with predetermined other data and providing printouts to a worker indicative of 1) a transaction between an operator of said vehicle and another party and 2) service requirements of said vehicle.

2. A system as set forth in claim 1 wherein said on-board means includes sensors for automatically recording data for the mileage of said vehicle and the relative amount of gasoline in a tank of said vehicle, said on-board means also including means for creating a data stream for downloading said identifying data and said mileage and gasoline data to said processor means via said transmitter and receiver means.

3. A system as set forth in claim 1, including storage means associated with said processor means containing information regarding a service record of said vehicle; and said processor means including means for updating said service record with information contained in said accumulated data.

4. A system as set forth in claim 1 including:

programming means at said site including a keyboard coupled to said processor means for programming said on-board means by transmitting programming data generated by keystrokes to said keyboard from said processor means to said on-board means via said transmitter means and said on-board transmitter and receiver means.

5. A system as set forth in claim 1 wherein said system is a subpart of a larger system and said processor means include a main processor forming part of said larger system and a local processor dedicated to said subpart and coupled to said main processor via an interface.

6. A system as set forth in claim 1 including a keypad mounted within a passenger compartment of said vehicle and coupled to said on-board means, said on-board means being responsive to keystrokes to said keypad for recording service data entered by an operator of said vehicle.

7. A system as set forth in claim 6 wherein each keystroke indicates a predetermined serviceable task and each key of said keypad includes a legend visually indicative of said serviceable task.

8. A system as set forth in claim 6 wherein each keystroke is an entry for a code comprising a predetermined number of keystrokes such that said code is correlated by said processor means with a serviceable task.

9. A system as set forth in claim 6 wherein each keystroke is an entry for a code comprising a predetermined number of consecutive keystrokes such that said code is correlated by said second processor means with a serviceable task.

10. At a site for servicing vehicles, a system for automatically providing information regarding service required of each vehicle entering said site, said system comprising:

an annunciator for automatically detecting the presence of a vehicle at said site;

a radio frequency transmitter at said site responsive to said annunciator for transmitting an interrogation signal to said vehicle;

sensors on-board said vehicle for providing signal indicative of the status of serviceable devices on said vehicle;

first processor means on-board said vehicle responsive to said sensed signals for generating data indicative of the status of said serviceable devices and combining said data with additional data containing information identifying said vehicle so as to form a data stream when said interrogation signal is transmitted;

means on-board said vehicle coupled to said processor means for downloading said data stream by a radio frequency signal;

second processor means at said site responsive to said data stream downloaded by said on-board means;

storage means associated with said second processor means containing information regarding a service record;

said second processor means including means for updating said service record with information contained in said data stream; and means responsive to said second processor means for transforming said data stream into visual service information for use in performing maintenance on said vehicle.

11. A system as set forth in claim 10 including a keypad mounted within a passenger compartment of said vehicle and coupled to said first processor means, said first processor means being responsive to keystrokes to said keypad for recording service data entered by an operator of said vehicle.

12. A system as set forth in claim 11 wherein each keystroke indicates a predetermined serviceable task and each key of said keypad includes a legend visually indicative of said serviceable task.

13. A method of automatically gathering identification and operating parameters from a vehicle at a predetermined site, said method comprising the steps of:

(a) automatically sensing the presence of a vehicle at said site;

(b) transmitting a radio frequency interrogation signal to said vehicle;

(c) receiving said interrogation signal by said vehicle and in response thereto:

(1) gathering information relating to said operating parameters of said vehicle;

(2) transmitting from said vehicle said information relating to said operating parameters of said vehicle and vehicle identification data as a radio frequency signal;

(d) receiving from said vehicle said information relating to said operating parameters of said vehicle;

(e) processing said information received from said vehicle into a predetermined digital form;

(f) verifying said information received from said vehicle and in response thereto:

(1) repeating from step (b) if said verification indicates said information received from said vehicle is not correct; or (2) transmitting a signal to said site acknowledging receipt of said information from said vehicle if said verification indicates said information received from said vehicle is correct.

* * * * *